(12) United States Patent
Yang et al.

(10) Patent No.: US 7,700,711 B2
(45) Date of Patent: Apr. 20, 2010

(54) MANUFACTURING METHOD OF LADDER-LIKE PHOSPHOROUS-CONTAINING POLYSILSESQUIOXANES NANOCOMPOSITE MATERIAL

(75) Inventors: Cheng-Chien Yang, Longtan Township, Taoyuan County (TW); Chen-Chi Martin Ma, HsinChu (TW); Wang Tsae Gu, HsinChu (TW); Yuen Hsin Peng, HsinChu (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 517 days.

(21) Appl. No.: 11/712,970

(22) Filed: Mar. 2, 2007

(65) Prior Publication Data

US 2008/0214734 A1 Sep. 4, 2008

(51) Int. Cl.
*C08G 77/30* (2006.01)

(52) U.S. Cl. .......................................... 528/30; 525/477

(58) Field of Classification Search ................. 525/477; 528/30

See application file for complete search history.

(56) References Cited

U.S. PATENT DOCUMENTS 2,978,471 A * 4/1961 Fekete .......................... 556/405

* cited by examiner

*Primary Examiner*—Kuo-Liang Peng
(74) *Attorney, Agent, or Firm*—Rosenberg, Klein & Lee

(57) ABSTRACT

A manufacturing method of ladder-like phosphorus-containing polysilsesquioxanes nanocomposite material is disclosed. The method uses a reaction between ladder-like phosphorus-containing polysilsesquioxanes and modified epoxy. Besides improved char yield and limiting oxygen index, thermal degradation rate of the nanocomposite material is lowered dramatically so that the nanocomposite material possesses excellent flame retardance and thermal stability. Moreover, optical transparency of the nanocomposite material according to the present invention is still good, not being reduced by increased amount of polysilsesquioxanes. Thus the nanocomposite material is applied to decorative paints or protective paints.

9 Claims, 5 Drawing Sheets

MANUFACTURING METHOD OF LADDER-LIKE PHOSPHOROUS-CONTAINING POLYSILSESQUIOXANES NANOCOMPOSITE MATERIAL

BACKGROUND OF THE INVENTION

The present invention relates to a manufacturing method of composite material, especially to a manufacturing method of a ladder-like phosphorus-containing polysilsesquioxanes organic/inorganic nanocomposite material.

Due to requirements for higher performance, improvement of various properties of the polymer materials such as thermal resistance, flame retardance, and mechanical feature is getting more important. A lot of research for improving polymer properties has been done continuingly. During theses characters, the most important is flame retardance because that the disadvantage of polymer is inflammable. When there is a fire, the polymer is easy to burn and generate toxic haze as well as char that lead to serious damage and properties loss.

Thus it is an important issue to develop flame retardant and related technology for polymers. Flame retardant is divided into two groups: organic and inorganic. The organic flame retardant mainly consists of halogen and phosphide. However, virulent toxin and corrosive gas such as hydrochloric acid, HBr, HCN and dioxin are released while burning halogen. This not only damage our health but also cause degradation of ozone layer on the earth so as to generate an enormous hole and cause damages to ecology of the earth. Due to more strict regulations and environmental protection consciousness, it is prohibited to use halogens. Thus there is a trend to develop new generation of new flame retardant.

Organic/inorganic hybrid material not only combines advantages of organic/inorganic fields but also possesses it's unique feature. In the related researches, organic polyorganosiloxanes is one of the important points. The basic structure of organic polyorganosiloxanes includes silicon, oxygen and siloxanes with organic group attached on the silicon. In 1863, Friedel and Crafts prepared the first compounds, in which carbon and silicon atoms were directly united. The first practical synthesis of organosilanes was accomplished by F. Stanley Kipping in 1904 by Grignard reagent reacting with silicon tetrachloride for the formation of the Si—C bond. Then by hydrolysis reaction and condensation reaction of siloxanes, silsesquioxanes are obtained. Until 1960, J. F. Brown, L. H. Vogt have established a synthesis method of silsesquioxanes.

As to the present invention, the sol-gel technology is used to prepare organic/inorganic hybrid material containing phosphorus and silicon so as to increase flame retardance of the material. Due to special features of sol-gel reaction, organic/inorganic materials are compatible, without phase separation. Inorganic materials are distributed inside organic materials in nano-scale so as to form nanocomposites materials with different properties of two materials.

SUMMARY OF THE INVENTION

Therefore it is a primary object of the present invention to provide a manufacturing method for an organic/inorganic nanocomposites-ladder-like phosphorus-containing polysilsesquioxanes that is a nanocomposite material possessing excellent thermal stability and flame retardance.

It is another object of the present invention to provide a manufacturing method for an organic/inorganic nanocomposites-ladder-like phosphorus-containing polysilsesquioxanes that possesses optical transparency for being applied to optical elements and high-performance coating materials.

In order to achieve above objects, a method for manufacturing ladder-like phosphorus-containing polysilsesquioxanes nanocomposite material by reaction between ladder-like phosphorus-containing polysilsesquioxanes and modified epoxy is disclosed. The char yield and limiting oxygen index of the material are improved while thermal degradation rate is lowered dramatically. The results show that the nanocomposite material possesses excellent flame retardance and thermal stability. Furthermore, optical transparency of the nanocomposite material is still good, not being reduced by increased amount of polysilsesquioxanes. Thus applications of the nanocomposite material are extended.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

By sol-gel reaction, phosphorus-containing polysilsesquioxanes are synthesized. The phosphorus and silicon containing therein work as of flame retardants of the polymer so that the material has excellent thermal properties and flame retardance.

Figure 1:
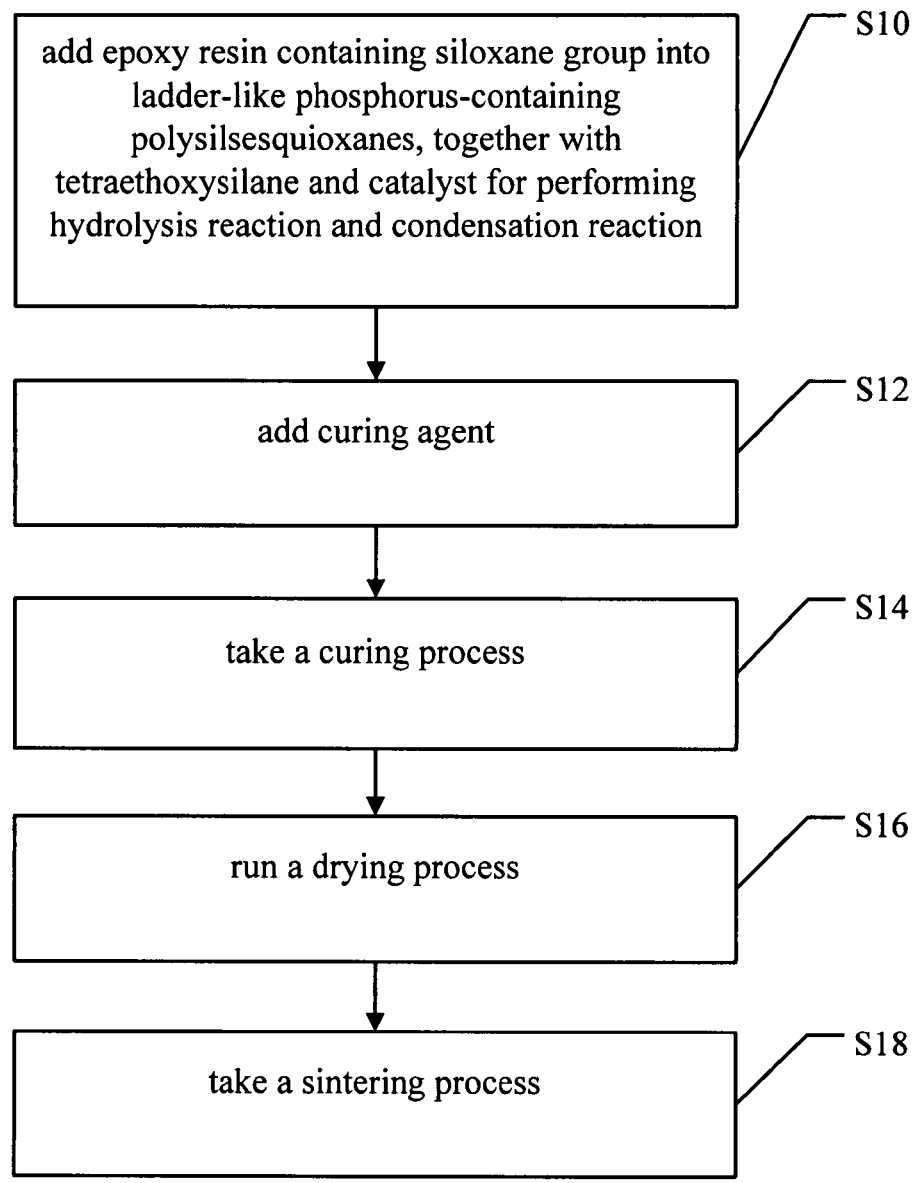
FIG. 1 is a flow chart showing a manufacturing method of ladder-like phosphorus-containing polysilsesquioxanes nanocomposite material of an embodiment according to the present invention.

Refer to step S10 in FIG. 1, add epoxy resin containing siloxane group into ladder-like phosphorus-containing polysilsesquioxanes, together with tetraethoxysilane and catalyst for performing hydrolysis reaction and condensation reaction. Then take step S12, add curing agent. Next, refer to step S14, take a curing process, step S16 run a drying process, and step S18 take a sintering process.

Figure 2:
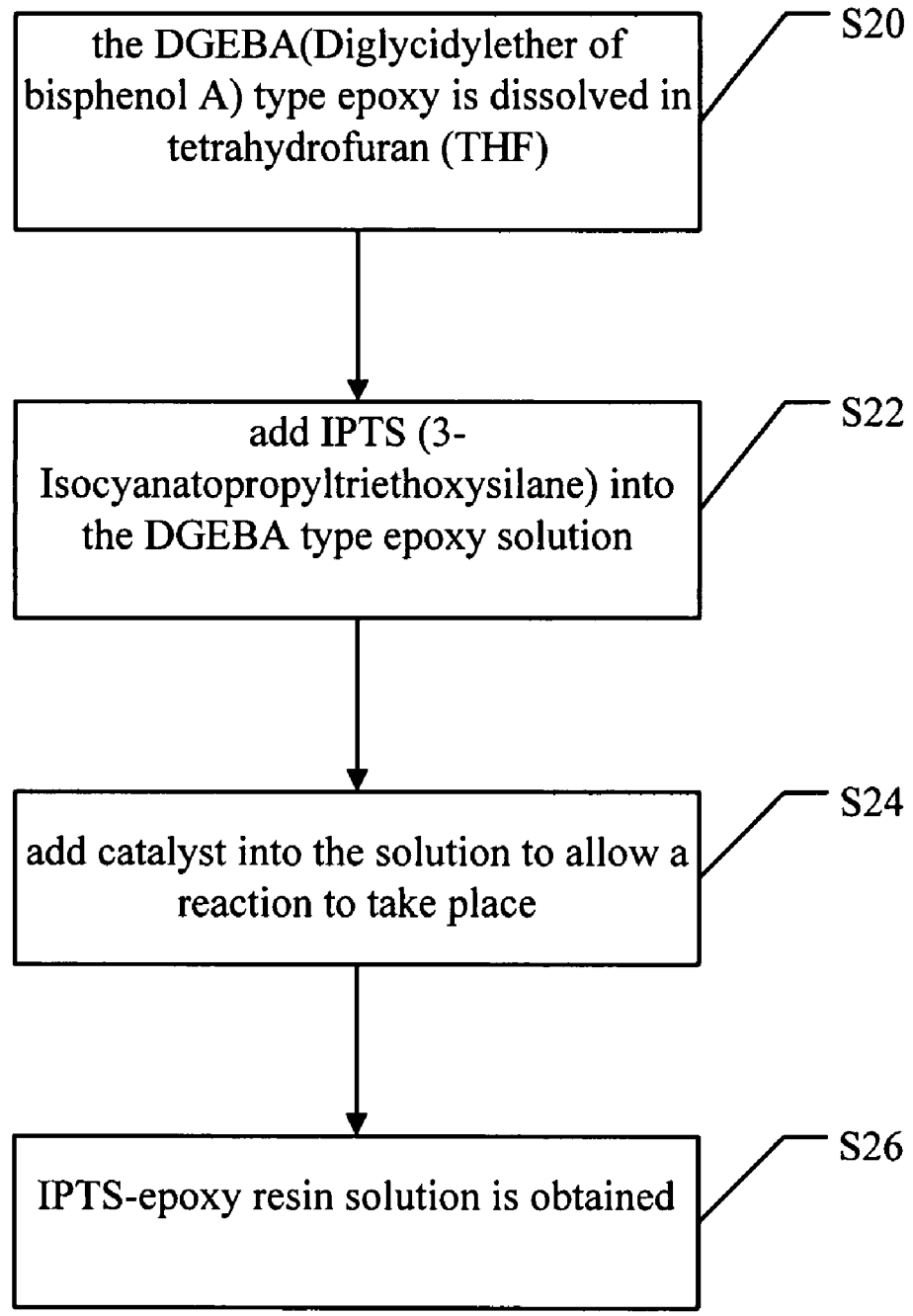
FIG. 2 is a flow chart showing a manufacturing method of IPTS-epoxy resin of an embodiment according to the present invention.
Figure 3:
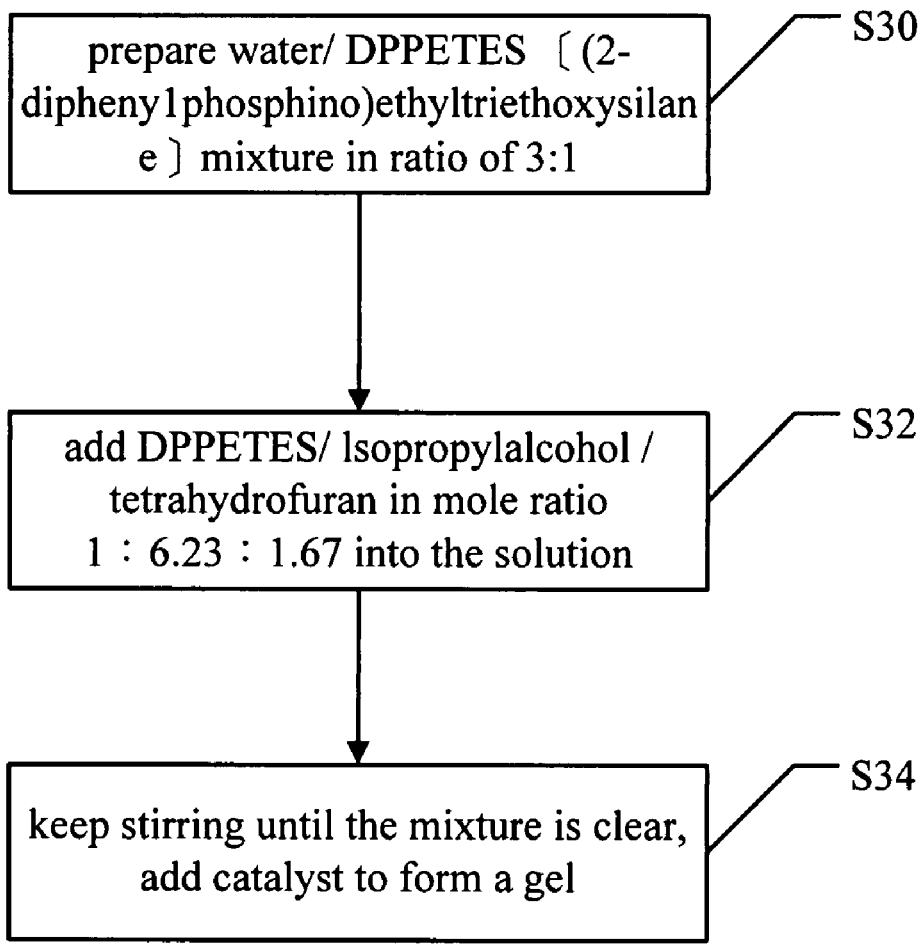
FIG. 3 is a flow chart showing a manufacturing method of ladder-like phosphorus-containing polysilsesquioxanes of an embodiment according to the present invention.

Moreover, the epoxy resin containing siloxane group is IPTS (3-Isocyanatopropyltriethoxysilane)-epoxy resin. Refer to FIG. 2, a manufacturing method for the IPTS-epoxy resin includes following steps:

Step S20, the DGEBA (Diglycidylether of bisphenol A) type epoxy is dissolved in tetrahydrofuran (THF). Then step S22, add IPTS (3-Isocyanatopropyltriethoxysilane) into the DGEBA type epoxy solution. Next step S24, add catalyst into the solution to allow a reaction to take place. Refer to step S26, IPTS-epoxy resin solution is obtained. Furthermore, refer to FIG. 3, a manufacturing method for ladder-like phosphorus-containing polysilsesquioxanes includes following steps:

Step S30: prepare water/DPPETES ((2-diphenylphosphino)ethyltriethoxysilane) mixture in ratio of 3:1;

Step S32: add DPPETES/lsopropylalcohol/tetrahydrofuran in mole ratio 1:6.23:1.67 into the solution;

Step S24, keep stirring until the mixture is clear, add catalyst to form a gel.

The following embodiment is taken as an example for explanation:

Preparation of Epoxy Resin Containing Siloxane Group

Prepare precursors of epoxy resin modified by 3-Isocyanatopropyltriethoxysilane (IPTS) so as to get epoxy resin with siloxane side chain.

Figure 4:
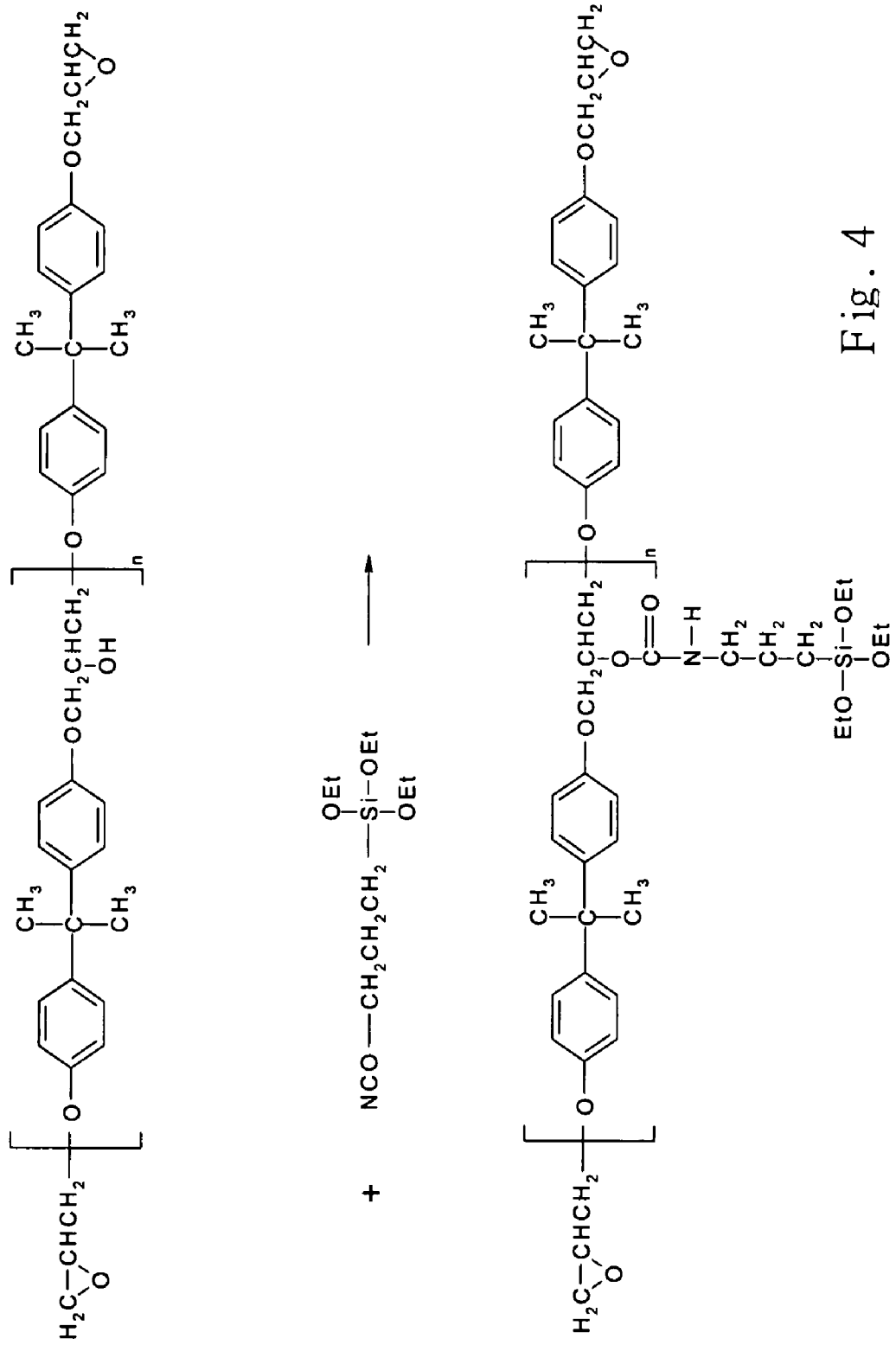
FIG. 4 is a schematic drawing showing chemical reaction for preparing IPTS-epoxy resin.

Dissolve 10 g DGEBA-type epoxy resin in 10 g THF and the solid content is about 50 wt %. Then 4 g IPTS (a NCO equivalent weight of 247 g) is slowly added into epoxy resin solution so that NCO group on IPTS reacts with hydroxy group on epoxy resin. TEA is added into the solution also as a catalyst. The mixture is stirred by a magnetic bar at the temperature of 60 degrees Celsius and is recycled so as to maintain the concentration. Fourier-transform infrared spectroscopy (FTIR) is used to detect reactions of the group. For reacting completely, it take about 20 to 24 hours and get IPTS-Epoxy solution. Refer to FIG. 4, a chemical reaction is disclosed.

Preparation of Ladder-Like Phosphorus-Containing Polysilsesquioxanes

Figure 5:
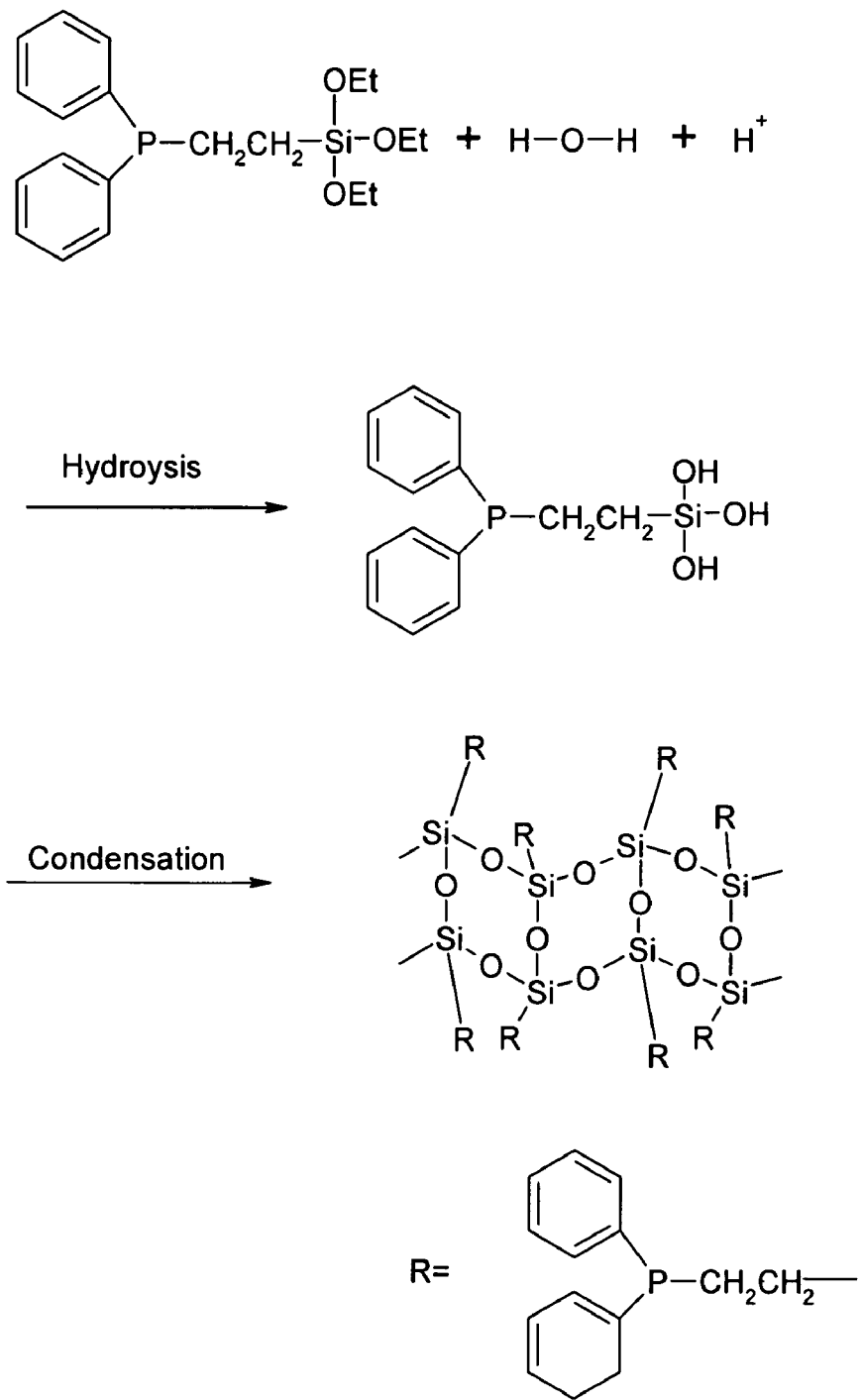
FIG. 5 is a schematic drawing showing chemical reaction for preparing ladder-like phosphorus-containing polysilsesquioxanes.

Put 5 g (2-diphenylphosphino)ethyltriethoxysilane (DPPETES) into a 20 mg sample vial and then add H2O/DPPETES in ratio of 3:1 into the sample vial. Next add DPPETES/lsopropylalcohol (IPA)/tetrahydrofuran (THF) in mole ratio 1:6.23:1.67 into the mixture and stir the solution until it is clear. Add hydrochloric acid as a catalyst to make pH of the solution become 2. Put the solution into an aluminum plate at the room temperature for 48 hours to make the solution become colloidal. Then keep it at the temperature of 80 degrees Celsius for 24 hours. The sample is vacuumed at the temperature of 200 degrees Celsius for 24 hours. Please refer to FIG. 5, a chemical reaction is disclosed.

Preparation of Modified Epoxy-DPPETES-TEOS Nanocomposite Material:

The IPTS-Epoxy resin is respectively added 3%, 6%, 9%, and 12% ladder-like DPPETES and then 9% TEOS is added in. Use hydrochloric acid as catalyst and stir the mixture at the room temperature for an hour so as to perform hydrolysis reaction and condensation reaction. Next add curing agent-4, 4-Methylenedianline (DDM) that is dissolved in THF in advance. Keep the solution at the room temperature for one day. Then heat the mixture at the temperature of 80 degrees Celsius for 2 hours and at the temperature of 160 degrees Celsius for 12 hours.

The modified epoxy is reacted completely after 8 hours. Thus by a long reaction time, the present invention prevent incomplete reaction. Moreover, optimum concentration of ladder-like polysiloxane and its monomer is 9 wt % that achieves best efficiency and lower cost. When being measured by Thermal Properties Test, the TGA data shows that char yield is improved to 30%, thermal degradation rate is obviously lowered and 30 limiting oxygen index (LOI) indicate that epoxy nanocomposites possess better properties. This also means nanocomposites material possesses excellent thermal stability and flame retardance. By doping, protective effects are formed due to low surface potential of polysiloxanes. As to modified resin, the flame retardance is caused by PU-type soft segment.

During thermal properties of ladder-like silsesquioxane, a reactive-type system has excellent thermal stabilities while in additive-type system, retardance is resulted from strong siloxane bond generating from siloxane bond on NCO segment reacting with ladder-like material or monomer. In optical tests, polysilsesquioxanes epoxy resin according to the present invention has excellent optical transparency in visible region (400 nm~800 nm). The present invention provides an excellent material for future development of optical elements and high performance nano-scale coating material. In structure research, X-ray image shows that epoxy resin nanocomposite materials are amorphous and there is a consistency of the spectrum obtained because there is no big difference in entanglements. The excellent transparency of the resin of the present invention results from no phase separation and amorphous structure.

Furthermore, in SEM (scanning electron microscopy) research, the organic/inorganic polysilsesquioxanes nanocomposite material has good compatibility without phase separation problem. In Si-mapping, it is further proved that inorganic phase (Si—O—Si) is distributed well and homogeneously. In the TEM (transmission electron microscope) image, the silsesquioxanes is in nano-scale (most of their size is less than 100 nm) and there is no aggregation problem. Although they are distributed irregularly, there is no phase separation. Thus epoxy materials formed by the present invention are obviously composite materials in nano-scale. In applications, such material with high thermal stability and high transparency is applied to painting paint for home decoration, protective coatings and protective layers of optical elements.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A manufacturing method of ladder-like phosphorus-containing polysilsesquioxanes nanocomposite material comprising the steps of:
    adding epoxy resin containing siloxane group into ladder-like phosphorus-containing polysilsesquioxanes, together with tetraethoxysilane and catalyst for performing hydrolysis reaction and condensation reaction adding curing agent; and
    taking a curing process, a drying process, and a sintering process.

2. The method as claimed in claim 1, wherein the epoxy resin containing siloxane group is IPTS (3-Isocyanatopropyltriethoxysilane)-epoxy resin.

3. The method as claimed in claim 2, wherein a manufacturing method of the IPTS-epoxy resin comprising the steps of
    dissolving DGEBA (Diglycidylether of bisphenol A) epoxy in tetrahydrofuran (THF);
    adding IPTS into the DGEBA type epoxy solution;
    adding catalyst into the solution to allow a reaction to take place; and
    getting IPTS-epoxy resin solution.

4. The method as claimed in claim 3, wherein the catalyst comprising triethanolamine.

5. The method as claimed in claim 1, wherein the catalyst is hydrogen chloride.

6. The method as claimed in claim 1, wherein the curing agent is 4,4-Methylenedianline (DDM).

7. The method as claimed in claim 1, wherein a concentration of the ladder-like phosphorus-containing polysilsesquioxanes is 9 wt %.

8. The method as claimed in claim 1, wherein the ladder-like phosphorus-containing polysilsesquioxanes nanocomposite material is composite material in nano-scale.

9. The method as claimed in claim 1, wherein the ladder-like phosphorus-containing polysilsesquioxanes nanocomposite material is amorphous.

* * * * *